United States Patent
Ishizaka et al.

(10) Patent No.: US 7,198,371 B2
(45) Date of Patent: Apr. 3, 2007

(54) IMAGE DISPLAYING APPARATUS

(75) Inventors: Yasuo Ishizaka, Yokohama (JP); Atsuhiro Yonekura, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 238 days.

(21) Appl. No.: 10/970,385

(22) Filed: Oct. 22, 2004

(65) Prior Publication Data
US 2005/0094104 A1 May 5, 2005

(30) Foreign Application Priority Data
Oct. 31, 2003 (JP) .......................... P2003-373318
Aug. 30, 2004 (JP) .......................... P2004-250836

(51) Int. Cl.
*G03B 21/00* (2006.01)
*G03B 21/14* (2006.01)

(52) U.S. Cl. ........................................ 353/20; 353/31
(58) Field of Classification Search ................ 353/20, 353/31, 33, 102, 98; 359/483
See application file for complete search history.

(56) References Cited

U.S. PATENT DOCUMENTS

| 6,340,230 B1 * | 1/2002 | Bryars et al. ................ 353/31 |
| 6,457,829 B1 * | 10/2002 | Nakazawa et al. ............ 353/31 |
| 6,739,723 B1 * | 5/2004 | Haven et al. ................ 353/20 |
| 7,061,679 B1 * | 6/2006 | Yoon et al. ................ 359/485 |

FOREIGN PATENT DOCUMENTS

| JP | 10-197949 | 7/1998 |
| JP | 2000-206463 | 7/2000 |
| JP | 2003-222724 | 8/2003 |
| JP | 2003-302523 | 10/2003 |

* cited by examiner

*Primary Examiner*—Melissa Jan Koval
(74) *Attorney, Agent, or Firm*—Nath Law Group PLLC; Gregory B. Kang; Stanley N. Protigal

(57) ABSTRACT

An image displaying apparatus employs quartz wave plates and displays images of high contrast. The quartz wave plates in the image displaying apparatus are each arranged between a polarizing beam splitter of a color separating-combining unit and a reflective spatial light modulator. Each of the quartz wave plates is made of two elementary quartz plates. An angle formed between slow axes of the two elemental quartz plates is within a range of 5 minutes to 15 minutes from a right angle.

5 Claims, 7 Drawing Sheets

IMAGE DISPLAYING APPARATUS

FIELD OF THE INVENTION

The present invention relates to an image displaying apparatus employing reflective spatial light modulators such as reflective liquid crystal light valves, to modulate light and display images.

BACKGROUND OF THE INVENTION

Image displaying apparatuses employing reflective spatial light modulators are capable of displaying images at high resolution and high contrast, and therefore, various types thereof have been developed and marketed.

The image displaying apparatuses are mostly three-plate color projectors employing three reflective spatial light modulators. The three-plate color projector separates a white beam emitted from a strong light source such as a metal halide lamp into three primary-color beams, guides the beams to the reflective spatial light modulators such as liquid crystal panels, respectively, drives the modulators with image signals of respective colors to modulate the beams, combines the modulated beams, and projects the combined beams to display an image.

FIG. 1 is a perspective view showing an optical system of an image displaying apparatus according to a related art.

The optical system shown in FIG. 1 is disclosed in, for example, Japanese Patent Application Laid-Open Publication No. H10-197949. This optical system has a two-layer structure. The upper layer of the optical system includes a light source 101 that emits a white beam. The white beam is passed through a collimator lens 102 and becomes substantially a parallel white beam. The parallel white beam is passed through an integrator 103, a cold mirror 104, and an infrared cut filter 105 and is made incident to a three-color-separation cross dichroic prism 106. The prism 106 separates the parallel white beam into three primary-color beams, i.e., red beam (R-beam), green beam (G-beam), and blue beam (B-beam) and emits these beams in three directions, respectively. The emitted R-, G-, and B-beams are made incident to polarizing beam splitters 107r, 107g, and 107b, respectively. Each of the splitters 107r, 107g, and 107b has a polarizing reflective face that reflects only an s-polarized component of the incident beam. The reflected beam components from the polarizing reflective faces of the splitters 107r, 107g, and 107b are emitted as parallel beams in a downward direction.

FIG. 2 is a perspective view showing an essential part of the optical system of FIG. 1.

In FIG. 2, the beams emitted from the polarizing beam splitters 107r, 107g, and 107b are passed through convex lenses 108r, 108g, and 108b and polarizers 109r, 109g, and 109b and are made incident to polarizing beam splitters 110r, 110g, and 110b of the lower layer, respectively. The incident beams are reflected by polarizing reflective faces of the splitters 110r, 110g, and 110b and are made incident to reflective spatial light modulators 111r, 111g, and 111b, respectively.

The reflective spatial light modulators 111r, 111g, and 111b modulate the incident beams according to image signals of respective colors supplied to the modulators 111r, 111g, and 111b and polarize and reflect the modulated beams. In FIG. 1, the reflected beams polarized and modulated by the modulators 111r, 111g, and 111b are transmitted through the polarizing beam splitters 110r, 110g, and 110b, respectively, and are made incident to a three-color-combining cross dichroic prism 112.

The three-color-combining cross dichroic prism 112 combines the incident beams of the respective colors and emits the combined beams to a projection lens 113. The projection lens 113 projects the beams onto a screen (not shown) to display an image.

This image displaying apparatus has a problem of lowering the contrast of a displayed image when incident beams have large angles with respect to optical axes of the polarizing beam splitters 110r, 110g, and 110b.

To solve the problem, wave plates 114 are arranged between the reflective spatial light modulators 111r, 111g, and 111b and the polarizing beam splitters 110r, 110g, and 110b, respectively. The wave plates 114 are each a quarter wave plate. Each of the wave plates 114 is arranged so that a fast axis or a slow axis thereof is orthogonal to a plane that includes an incident optical axis and a reflective optical axis of the polarizing beam splitter. The wave plates 114 improve the contrast of a displayed image.

The details of contrast improvement are described in Japanese Patent Application Laid-Open Publication No. 2000-206463. Namely, a beam made incident to a polarizing beam splitter may have an angle with respect to a plane (incident plane) containing an incident optical axis and a reflective optical axis of the splitter. When such an oblique beam is reflected by a reflective spatial light modulator and is again made incident to the splitter, the wave plate corrects a polarization direction of the beam. This correction makes the beam to be completely reflected by the splitter when the beam is to display a black color, to thereby improve the contrast of a displayed image.

In this way, the quarter wave plates prevent the lowering of the contrast of a displayed image when beams are obliquely made incident to the polarizing beam splitters. With the quarter wave plates, the image displaying apparatus can increase the spreading angles of beams made incident to the splitters, to display bright and high-contrast images.

The quarter wave plate is made by attaching a polymeric film made of polyvinyl alcohol or polycarbonate to one surface of a glass substrate through an adhesive layer or a bonding layer. Alternatively, such a polymeric film may be sandwiched between two glass substrates.

The polymeric film is produced by stretching polymeric material in an axial direction. By adjusting a stretching factor, it is possible to adjust the refractive indexes of the film in the stretching direction and in a direction orthogonal to the stretching direction, as well as controlling the thickness and phase difference of the film.

Polymeric materials generally show a large refractive index in a stretching direction and have a positive intrinsic birefringence ($\Delta n > 0$). A direction in which a refractive index increases is referred to as a slow axis, or simply as an optical axis. A direction orthogonal to the slow axis is referred to as a fast axis.

Due to the uniaxial stretching, the polymeric film has a phase characteristic and easily changes a phase difference in response to mechanical stress. If a temperature change occurs, it may cause mechanical stress through thermal expansion, to change the phase difference characteristic of the polymeric film.

For example, an increase in the intensity of the light source in the image displaying apparatus leads to increase the temperature of optical parts. Heat absorption of the optical parts causes mechanical stress that may cause reversible change or irreversible deterioration on the phase difference characteristics of the wave plates.

In addition, the wave plate with the polymeric film has a problem in connection with in-plane uniformity due to the phase difference.

There is a wave plate that employs crystals such as quartz crystals. Quartz wave plates are disclosed in, for example, Japanese Patent Application Laid-Open Publications No. 2003-222724 and No. 2003-302523 and in a catalogue (Laser & Optics Guide: Optical Parts) of MELLES GRIOT. The quartz wave plates (quarter wavelength) have no problems mentioned above and can be employed to form an image displaying apparatus capable of withstanding a high-output light source to display bright images.

The quartz wave plates are classified into first-order quarter wave plates and multiple-order quarter wave plates. The first-order quarter wave plates provide a beam having a phase difference of just a quarter wavelength. The multiple-order quarter wave plates provide a beam having a phase difference of a quarter wavelength plus an integer multiple of a wavelength. It is preferable for wave plates used for image displaying apparatuses to produce a phase difference of quarter wavelength for a separated color beam. In this regard, the first-order quarter wave plates are preferable for image displaying apparatuses.

To form a first-order quartz wave plate from a single quartz plate, the quartz plate must have a thickness of 10 μm to 20 μm. For the present polishing technology, it is difficult to practically produce such plates. Therefore, the first-order quarter wave plate is made by laminating two elemental quartz plates with slow axes thereof being oriented substantially orthogonal to each other.

In such a laminated quartz wave plate, the slow axes of the elemental quartz plates must be orthogonal to each other. Perfectly orthogonalizing the slow axes of elemental quartz plates, however, is difficult to achieve economically.

SUMMARY OF THE INVENTION

An object of the present invention is to provide an image displaying apparatus employing quartz wave plates to display images of high contrast.

In order to accomplish the object, an aspect of the present invention provides an image displaying apparatus including a white light source configured to emit a white beam; a separating-combining unit having wavelength-selective wave plates and polarizing beam splitters, configured to receive the white beam and separate the white beam into three primary-color beams and receive a reflected beams, combine the reflected beams, and emit the combined beams; reflective spatial light modulators configured to receive the three primary-color beams, respectively, modulate the received beams, and reflect the modulated beams toward the separating-combining unit; a projecting unit configured to receive the combined beams and project the combined beams; and a quartz wave plate arranged between each of the polarizing beam splitters of the separating-combining unit and each of the reflective spatial light modulators, configured to adjust a polarization direction of the beam emitted from the separating-combining unit toward the reflective spatial light modulator. The quartz wave plate is made of laminated two elemental quartz plates. An angle formed between slow axes of the two elemental quartz plates is within a range of 5 minutes to 15 minutes from a right angle.

Desirably, the quartz wave plate arranged between each of the polarizing beam splitters of the separating-combining unit and each of the reflective spatial light modulators consists of two elemental quartz plates. An angle formed between the slow axes of the two elemental quartz plates is within a range of 5 minutes to 15 minutes from a right angle. This quartz wave plate is easy to manufacture and is capable of displaying images of high contrast.

Desirably, the quartz wave plate is arranged in each of optical paths of the three primary-color beams emitted from the separating-combining unit. A total thickness of the quartz wave plate is individually determined according to a wavelength of the primary-color beam to transmit.

Desirably, the quartz wave plate is provided with, on one or both surfaces thereof, a glass plate having no birefringence.

According to still another aspect of the present invention, an external surface of the glass plate is provided with a curvature.

According to the image displaying apparatus of the present invention, the quartz wave plate arranged between each of the polarizing beam splitters of the separating-combining unit and each of the reflective spatial light modulators consists of two elemental quartz plates. An angle formed between the slow axes of the two elemental quartz plates is within a range of 5 minutes to 15 minutes from a right angle, to display images of high contrast.

In this way, the present invention realizes an image displaying apparatus employing quartz wave plates to display images of high contrast.

DETAILED DESCRIPTION OF EMBODIMENTS

The present invention now will be described more fully hereinafter with reference to the accompanying drawings, in which preferred embodiments of the inventions are shown. This invention may, however, be embodied in many different forms and should not be construed as limited to the embodiments set forth herein; rather, these embodiments are provided so that this disclosure will be thorough and complete, and will fully covey the scope of the invention to those skilled in the art. Like numbers refer to like elements throughout.

An image displaying apparatus according to an embodiment of the present invention will be explained in detail with reference to the accompanying drawings.

Embodiment of Image Displaying Apparatus

Figure 1:
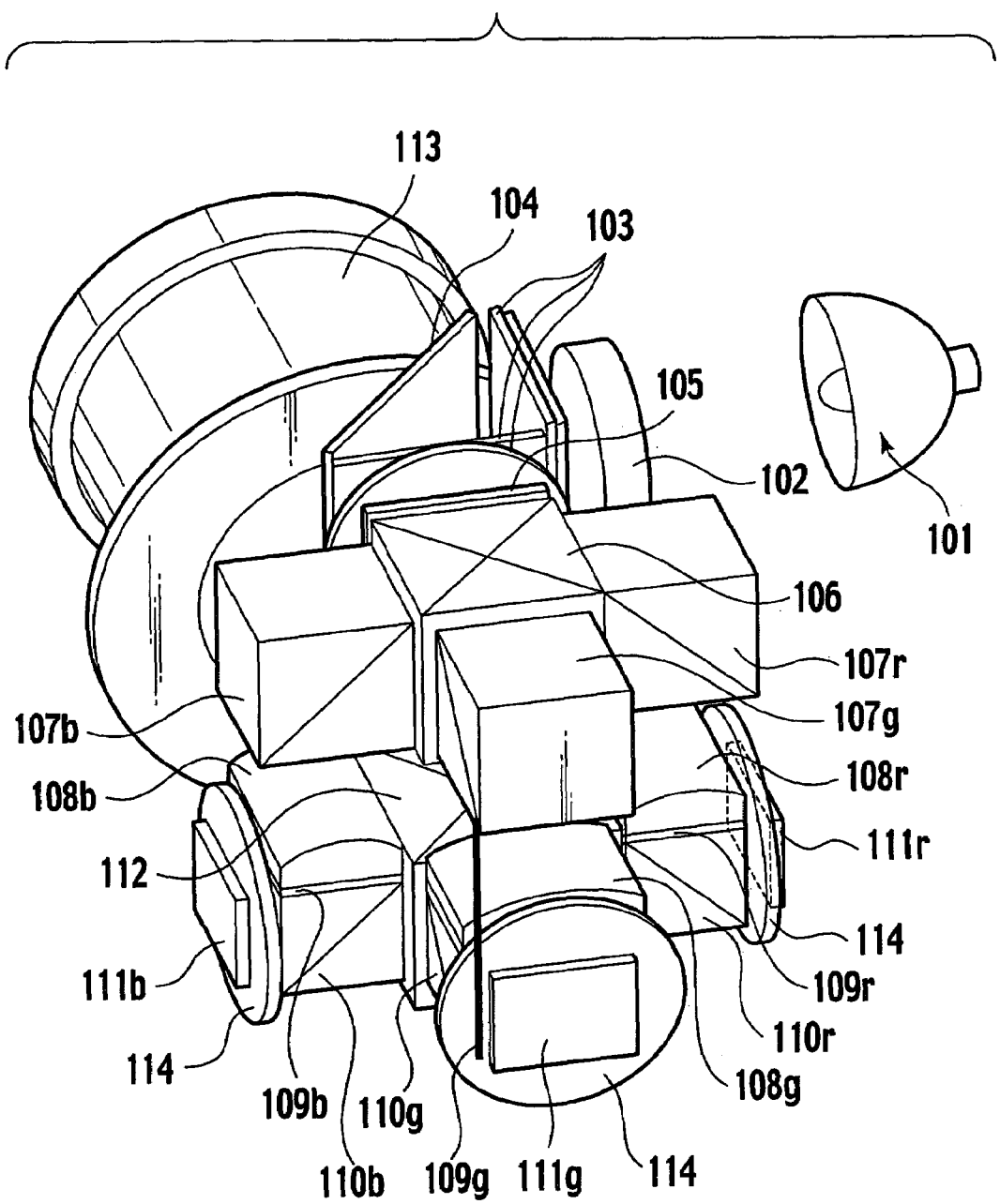
FIG. 1 is a perspective view showing an optical system of an image displaying apparatus according to a related art.
Figure 2:
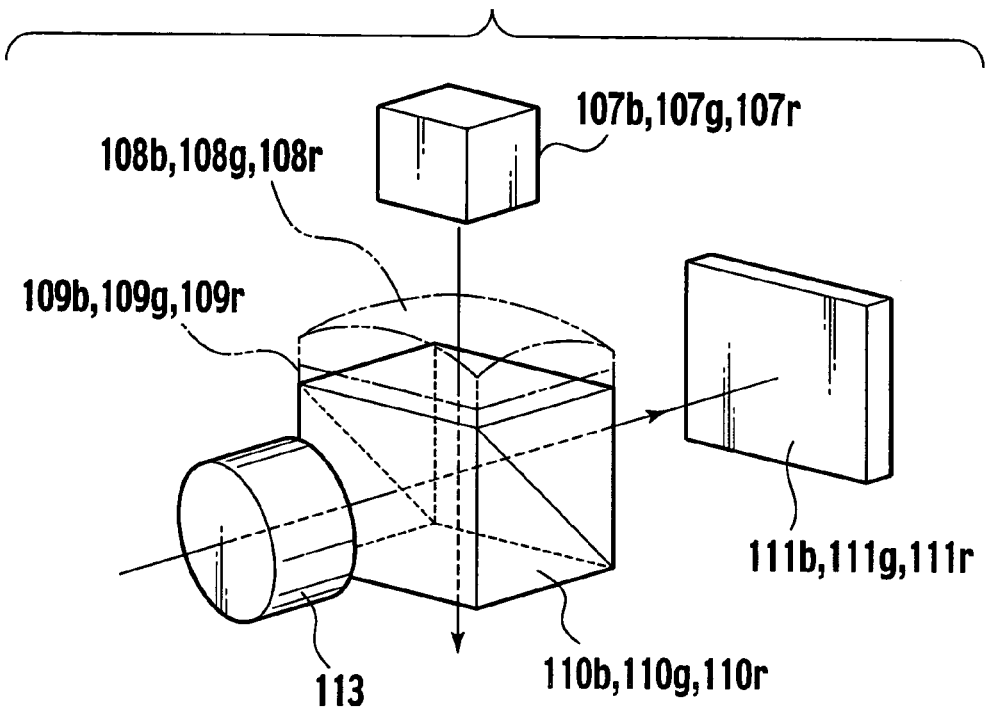
FIG. 2 is a perspective view showing an essential part of the optical system of FIG. 1.
Figure 3:
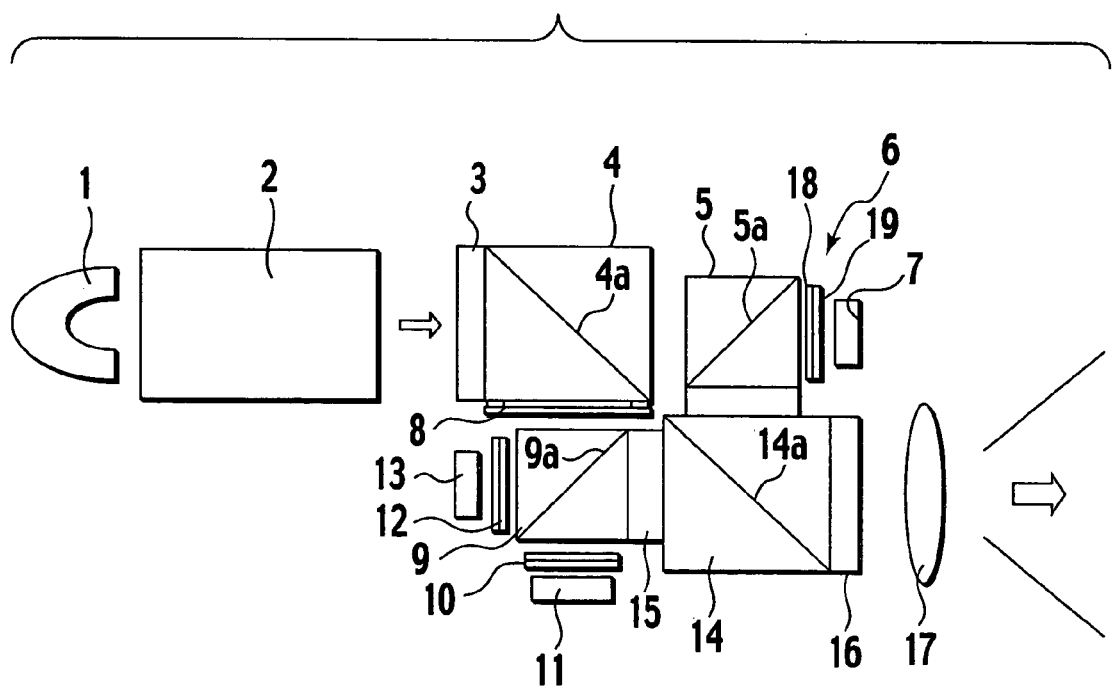
FIG. 3 is a side view showing an image displaying apparatus according to an embodiment of the present invention.

FIG. 3 is a side view showing an image displaying apparatus according to an embodiment of the present invention.

In FIG. 3, a light source 1 emits a beam of visible light band. The beam is provided with a uniform illuminance through an illuminating optical system 2, is passed through a first wavelength selective wave plate 3, and is made incident to a first polarizing beam splitter 4. The first wavelength selective wave plate 3 forms a green beam (G-beam) as a p-polarized beam with respect to a polarizing reflective face 4a of the splitter 4, and a red beam (R-beam) and a blue beam (B-beam) as s-polarized beams with respect to the face 4a. As a result, the G-beam is transmitted through the face 4a, and the R- and B-beams are reflected thereby.

The G-beam transmitted through the first polarizing beam splitter 4 is transmitted through a second polarizing beam splitter 5 as well as a quartz wave plate 6 and is made incident to a green-beam reflective spatial light modulator 7.

The R- and B-beams reflected by the first polarizing beam splitter 4 are passed through a second wavelength selective wave plate 8 and are made incident to a third polarizing beam splitter 9. The second wavelength selective wave plate 8 forms the R-beam as a p-polarized beam with respect to a polarizing reflective face 9a of the splitter 9, and the B-beam as an s-polarized beam with respect to the face 9a. As a result, the face 9a transmits the R-beam and reflects the B-beam.

The R-beam transmitted through the third polarizing beam splitter 9 is transmitted through a quartz wave plate 10 and is made incident to a red-beam reflective spatial light modulator 11. The B-beam reflected by the splitter 9 is transmitted through a quartz wave plate 12 and is made incident to a blue-beam reflective spatial light modulator 13.

The reflective spatial light modulators 7, 11, and 13 modulate the G-, R-, and B-beams according to green, red, and blue image signals supplied to the modulators 7, 11, and 13, respectively. Also, the modulators 7, 11, and 13 polarize and reflect the modulated beams.

The polarized, modulated, reflected G-beam from the reflective spatial light modulator 7 is reflected by a polarizing reflective face 5a of the second polarizing beam splitter 5 and is made incident to a fourth polarizing beam splitter 14. The polarized, modulated, reflected R-beam from the reflective spatial light modulator 11 is reflected by the polarizing reflective face 9a of the third polarizing beam splitter 9, is transmitted through a third wavelength selective wave plate 15, and is made incident to the splitter 14. The polarized, modulated, reflected B-beam from the reflective spatial light modulator 13 is transmitted through the face 9a of the splitter 9 and the wavelength selective wave plate 15, and is made incident to the splitter 14.

The third wavelength selective wave plate 15 turns the polarization direction of the R-beam by 90 degrees.

On a polarizing reflective face 14a of the fourth polarizing beam splitter 14, the G-beam is s-polarized and the R- and B-beams are p-polarized. Accordingly, the G-beam is reflected by the face 14a, and the R- and B-beams are transmitted through the face 14a, so that the G-, R-, and B-beams are combined.

The combined beams are transmitted through a fourth wavelength selective wave plate 16 and are made incident to a projection lens 17. The wave plate 16 turns the polarization direction of the G-beam by 90 degrees, to align the polarization directions of the G-, R-, and B-beams transmitted through the wave plate 16.

The projection lens 17 projects the incident beams onto a screen (not shown) to display an image.

In the image displaying apparatus, the quartz wave plates 6, 10, and 12 arranged between the reflective spatial light modulators 7, 11, and 13 and the second and third polarizing beam splitters 5 and 9 are quarter wave plates based on the wavelengths of the respective beams to transmit. The quartz wave plates 6, 10, and 12 correct the phase characteristics of transmitting beams to correct deviations from linear polarization of components of the beams that are obliquely made incident to the polarizing reflective faces 5a and 9a of the splitters 5 and 9. As a result, the transmitted beams become linearly polarized beams with respect to the polarizing reflective faces 5a and 9a. The quartz wave plates 6, 10, and 12 also function to correct the beams for pre-tilts of liquid crystals of the modulators 7, 11, and 13.

First Embodiment of Quartz Wave Plate

A first embodiment of the quartz wave plates 6, 10, and 12 of the image displaying apparatus according to the present invention will be explained.

Figure 4:
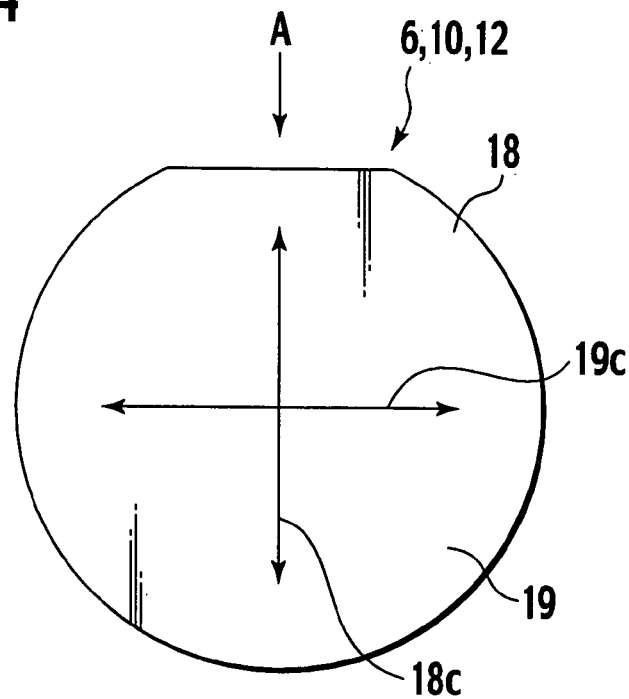
FIG. 4 is a front view showing a quartz wave plate arranged in the apparatus of FIG. 3.

FIG. 4 is a front view showing one of the quartz wave plates 6, 10, and 12. A direction perpendicular to the surface of FIG. 4 is a beam incoming/outgoing direction.

Figure 5:
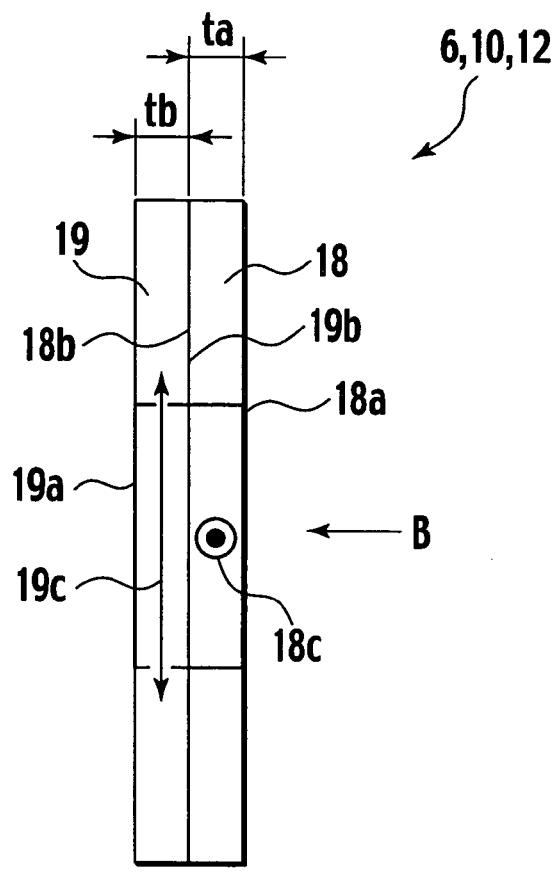
FIG. 5 is a side view showing the quartz wave plate of FIG. 4.

FIG. 5 is a side view showing the quartz wave plate seen from a direction A shown in FIG. 4. In FIG. 5, an arrow mark B is a beam incoming direction.

In FIGS. 4 and 5, the quartz wave plate (6, 10, 12) is made of two elemental quartz plates 18 and 19 bonded together with an optical adhesive. The elemental quartz plates 18 and 19 have disk shapes and are made of, for example, pure Z-plates cut from a quartz Z-plate ore.

On the elemental quartz plates 18 and 19, a Y-direction is a beam incident direction indicated with the arrow mark B in FIG. 5. Principal planes 18a, 18b, 19a, and 19b of the elemental quartz plates 18 and 19 are each an X-Z plane. When any one of the elemental quartz plates 18 and 19 transmits a beam in the Y-axis direction, a refractive index nz in a Z-axis direction and a refractive index nx in an X-axis direction differ from each other.

An optical axis 18c (Z-axis of quartz crystal) of the quartz plate 18 is orthogonal to an optical axis 19c (X-axis of quartz crystal) of the quartz plate 19. The quartz plate 18 has a thickness of ta and the quartz plate 19 has a thickness of tb. These thicknesses ta and tb differ from each other.

For example, the difference T (=ta−tb) between the thickness ta of the quartz plate 18 and the thickness tb of the quartz plate 19 is 12.3 μm for the blue-beam quartz wave plate 12, 14.7 μm for the green-beam quartz wave plate 6, and 17.4 μm for the red-beam quartz wave plate 10.

In this way, the characteristics of the quartz wave plate made of the laminated two elemental quartz plates 18 and 19 are equal to those of a single-layer quartz wave plate whose thickness is equal to the difference between the thicknesses of the elemental quartz plates 18 and 19.

Processing a quartz plate to a predetermined flatness and thickness is achievable according to known techniques, and therefore, it is easy to make a pair of quartz plates 18 and 19 having a predetermined thickness difference.

Phase difference characteristic of the quartz wave plate will be explained. When a beam having a wavelength of λ (nm) is transmitted through the quartz wave plate (6, 10, 12) having a wavelength selectivity of ½, there is caused a phase difference of A (degree). At this time, the elemental quartz plates 18 and 19 have a thickness difference of T (mm), a refractive index of nz in the Z-axis direction, and a refractive index of nx in the X-axis direction. Then, the phase difference A is expressed as follows:

$$A = 360\, T \times (nz - nx)/\lambda$$

Table 1 shows phase differences of the quartz wave plates 6, 10, and 12 for different wavelengths.

TABLE 1

A: Phase difference (degree)
$A = 360T \times (nz - nx)/\lambda$

| | | Thickness difference (T) μm | | |
|---|---|---|---|---|
| Wavelength (nm) | nz − nx (×10) | 12.3 Phase difference (Blue) | 14.7 Phase difference (Green) | 17.4 Phase difference (Red) |
| 400 | 9.56  | 105.8 | 126.5 | 149.7 |
| 410 | 9.53  | 102.9 | 123   | 145.6 |
| 420 | 9.48  | 99.9  | 119.4 | 141.4 |
| 430 | 9.445 | 97.3  | 116.2 | 137.6 |
| 440 | 9.41  | 94.7  | 113.2 | 134   |
| 450 | 9.38  | 92.3  | 110.3 | 130.6 |
| 460 | 9.355 | 90.1  | 107.6 | 127.4 |
| 470 | 9.33  | 87.9  | 105.1 | 124.3 |
| 480 | 9.31  | 85.9  | 102.6 | 121.5 |
| 490 | 9.28  | 83.9  | 100.2 | 118.6 |
| 500 | 9.26  | 82    | 98    | 116   |
| 510 | 9.24  | 80.2  | 95.9  | 113.5 |
| 520 | 9.22  | 78.5  | 93.8  | 111.1 |
| 530 | 9.2   | 76.9  | 91.9  | 108.7 |
| 540 | 9.185 | 75.3  | 90    | 106.5 |
| 550 | 9.17  | 73.8  | 88.2  | 104.4 |
| 560 | 9.155 | 72.4  | 86.5  | 102.4 |
| 570 | 9.14  | 71    | 84.9  | 100.4 |
| 580 | 9.125 | 69.7  | 83.3  | 98.6  |
| 590 | 9.11  | 68.4  | 81.7  | 96.7  |
| 600 | 9.095 | 67.1  | 80.2  | 95    |
| 610 | 9.08  | 65.9  | 78.8  | 93.2  |
| 620 | 9.07  | 64.8  | 77.4  | 91.6  |
| 630 | 9.06  | 63.7  | 76.1  | 90.1  |
| 640 | 9.045 | 62.6  | 74.8  | 88.5  |
| 650 | 9.035 | 61.5  | 73.6  | 87.1  |
| 660 | 9.02  | 60.5  | 72.3  | 85.6  |
| 670 | 9.01  | 59.5  | 71.2  | 84.2  |
| 680 | 9     | 58.6  | 70    | 82.9  |
| 690 | 8.99  | 57.7  | 68.9  | 81.6  |
| 700 | 8.98  | 56.8  | 67.9  | 80.4  |

Figure 6:
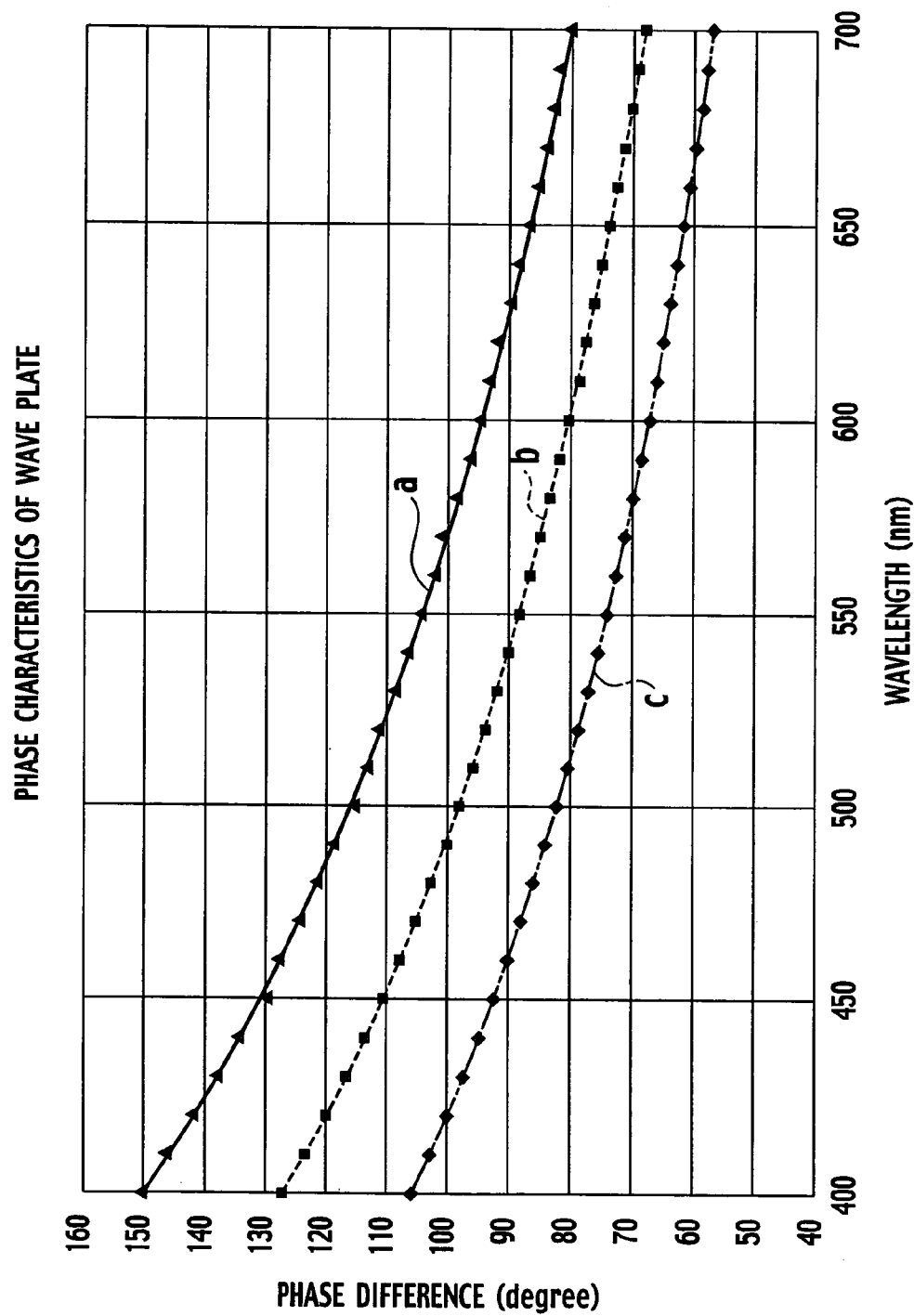
FIG. 6 is a graph showing phase characteristics of quartz wave plates arranged in the apparatus of FIG. 3.

FIG. 6 is a graph showing phase characteristics of the quartz wave plates.

In FIG. 6, curves a, b, and c represent the phase differences of red (R), green (G), and blue (B) beams.

The phase differences A obtained for wavelengths in the range of 400 nm to 700 nm change as shown in Table 1. The curves a, b, and c of FIG. 6 are based on the values shown in Table 1 and indicate that the phase difference decreases as the wavelength extend. The values in Table 1 were calculated with the thickness difference T of the quartz wave plate for blue being 12.3 μm, that for green being 14.7 μm, and that for red being 17.4 μm.

The phase difference is also called retardance, and the quartz wave plate is called a retarder.

Figure 7:
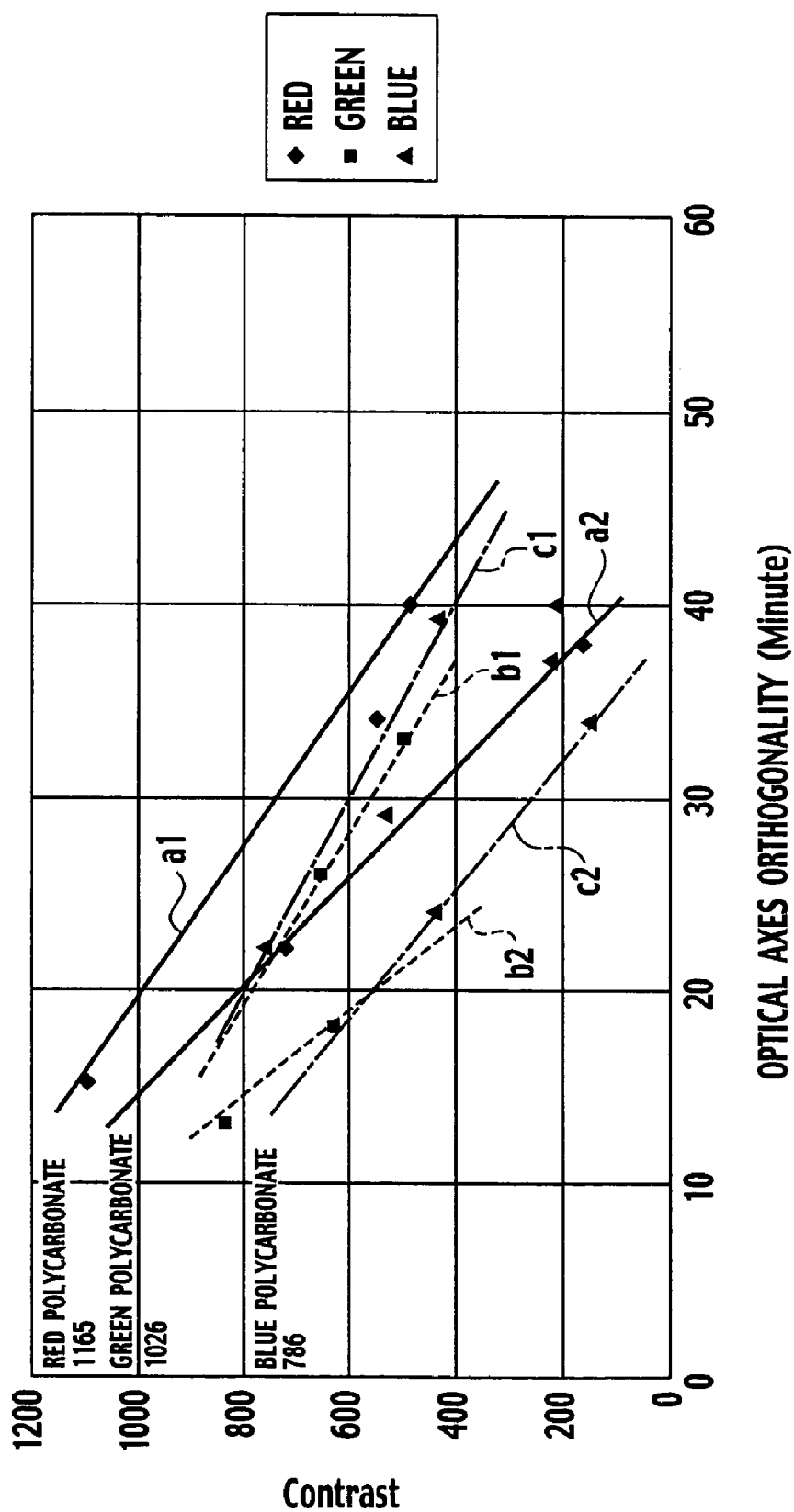
FIG. 7 is a graph showing a relationship between the orthogonality of elemental quartz plates of a quartz wave plate and the contrast of a displayed image.

FIG. 7 is a graph showing a relationship between the orthogonality of elemental quartz plates of a quartz wave plate and the contrast of displayed images.

In FIG. 7, straight lines a1 and a2 represent upper envelope (upper bound) and lower envelope (lower bound) of variation of contrast for red (R) beam, respectively. Similarly, straight lines b1 and b2 represent upper envelope (upper bound) and lower envelope (lower bound) of variation of contrast for green (G) beam, respectively. Straight lines c1 and c2 represent upper envelope (upper bound) and lower envelope (lower bound) of variation of contrast for blue (B) beam, respectively. On the left side of FIG. 7, contrasts obtained with polycarbonate wave plates for red (R), green (G), and blue (B) beams are shown.

The data shown in FIG. 7 indicates that the contrast of displayed images improves as the orthogonality of the optical axes of the elemental quartz plates 18 and 19 improves.

FIG. 7 also indicates that, if the orthogonality of the optical axes of the elemental quartz plates 18 and 19 is low, an absolute contrast value is low, and in addition, the contrast widely fluctuates. The reason of this is probably because of improper management of the total thickness of the two elemental quartz plates.

To cope with this problem, the thickness tolerance of each elemental quartz plate must strictly be controlled so that a pair of elemental quartz plates may provide a predetermined thickness difference. Namely, the thickness of each elemental quartz plate must be managed to the order of several microns.

This, however, deteriorates the productivity (yield) of quartz wave plates. It is preferable to relax the thickness tolerance of each elemental quartz plate, rank the elemental quartz plates according to thicknesses, and pair the elemental quartz plates according to the ranks. This will improve the yield of quartz wave plates. The quarts wave plates used for the graph of FIG. 7 were made in such a way.

When a linearly polarized beam is made incident to a quartz wave plate, polarization of the beam changes. This change is analyzed with the use of Jones matrices.

Figure 8:
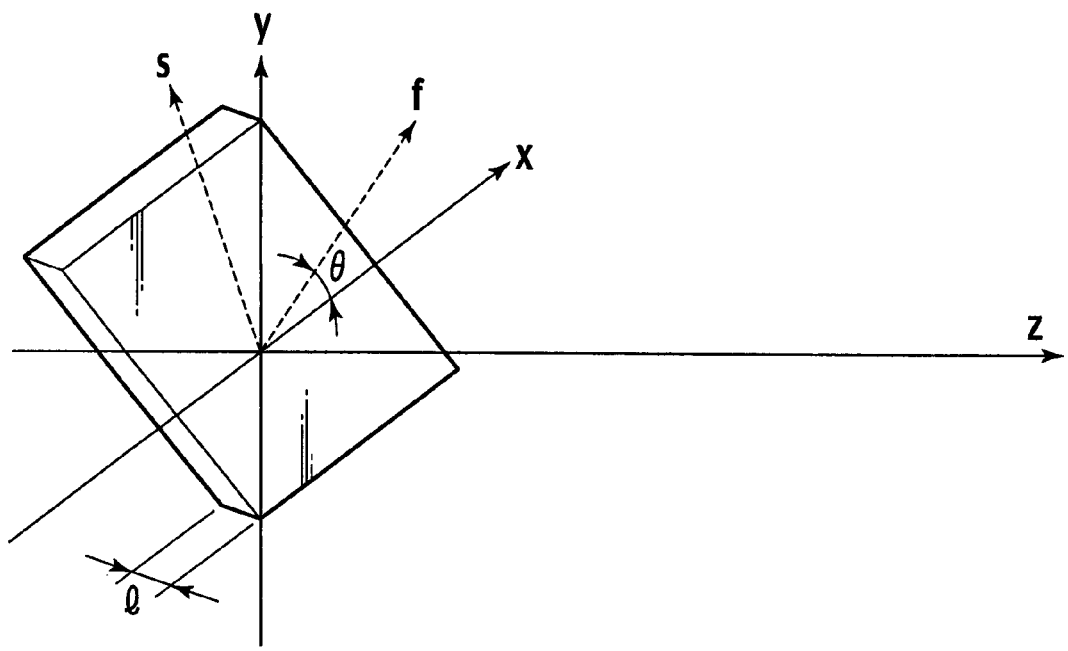
FIGS. 8 is a perspective view showing a quartz wave plate provided with a glass plate having a curvature on one side according to an embodiment of the present invention.

FIG. 8 shows a quartz plate having a thickness of l and a fast axis that forms an angle of θ with respect to an x-axis. Polarization of a beam before and after incident to the wave plate is expressed as the following expression (1) with Jones vectors and Jones matrices. The Jones vector is a vector indicating polarization of a beam, and the Jones matrix is a matrix of two rows by two columns indicating action of an element (i.e., the quartz plate) that changes the state of a beam. "Γ" is a phase difference (radian) of the element (quartz plate) and is equal to "(ns−nf) (2π/λo)l."

$$\begin{pmatrix} Ex' \\ Ey' \end{pmatrix} = \begin{pmatrix} \cos\theta & -\sin\theta \\ \sin\theta & \cos\theta \end{pmatrix} \begin{pmatrix} e^{i\frac{\Gamma}{2}} & 0 \\ 0 & e^{-i\frac{\Gamma}{2}} \end{pmatrix} \begin{pmatrix} \cos\theta & \sin\theta \\ -\sin\theta & \cos\theta \end{pmatrix} \begin{pmatrix} Ex \\ Ey \end{pmatrix} \quad (1)$$

If the quartz plate is of quarter wavelength (Γ=π/2) and is arranged at θ=0, then the expression (1) becomes as follows:

$$\begin{pmatrix} Ex' \\ Ey' \end{pmatrix} = \begin{pmatrix} e^{i\frac{\Gamma}{2}} & 0 \\ 0 & e^{-i\frac{\Gamma}{2}} \end{pmatrix} \begin{pmatrix} Ex \\ Ey \end{pmatrix} = \begin{pmatrix} e^{\frac{\pi}{4}i} & 0 \\ 0 & e^{-\frac{\pi}{4}i} \end{pmatrix} \begin{pmatrix} Ex \\ Ey \end{pmatrix} \quad (2)$$

Figure 9:
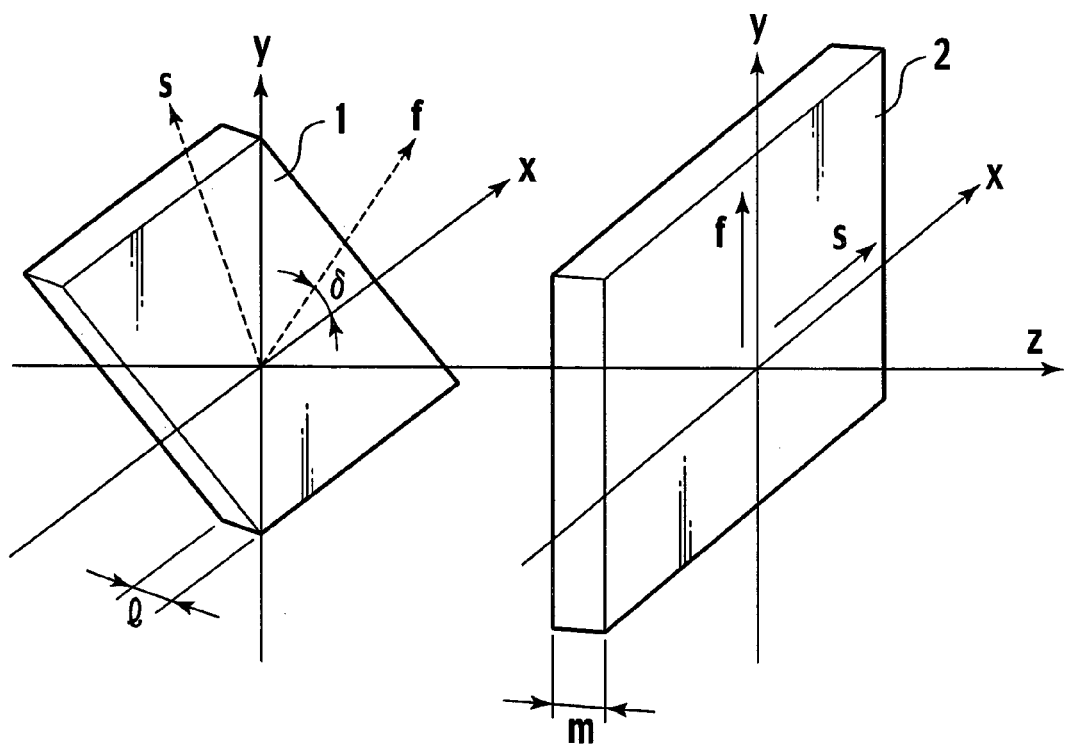
FIG. 9 is a perspective view showing quartz plates having thicknesses of l and m, respectively.

FIG. 9 shows two quartz plates 1 and 2 having thicknesses l and m, respectively. The fast axis of the quartz plate 1 forms an angle of δ with respect to an x-axis, and that of the quartz plate 2 is orthogonal to the x-axis. In this case, polarization of a beam before and after incident to the wave plates is expressed as the following expression (3) with the use of Jones vectors and Jones matrices. In the following expression, Γl=(ns−nf) (2π/λo)l, and Γm=(−ns+nf) (2π/λo) m.

$$\begin{pmatrix} Ex' \\ Ey' \end{pmatrix} = \underbrace{\begin{pmatrix} \cos\delta & -\sin\delta \\ \sin\delta & \cos\delta \end{pmatrix} \begin{pmatrix} e^{i\frac{\Gamma l}{2}} & 0 \\ 0 & e^{-i\frac{\Gamma l}{2}} \end{pmatrix}}_{\mathbb{A}} \underbrace{\begin{pmatrix} \cos\delta & \sin\delta \\ -\sin\delta & \cos\delta \end{pmatrix} \begin{pmatrix} e^{i\frac{\Gamma m}{2}} & 0 \\ 0 & e^{-i\frac{\Gamma m}{2}} \end{pmatrix}}_{\mathbb{B}} \quad (3)$$

$$\begin{pmatrix} Ex \\ Ey \end{pmatrix}$$

$$= \mathbb{A} \cdot \mathbb{B} \begin{pmatrix} Ex \\ Ey \end{pmatrix}$$

If "$\delta = 0$" and "$\Gamma l + \Gamma m = \frac{1}{2}\pi$" in the expression (3), then the expression (3) becomes the following expression (4), which is equal to the expression (2).

$$\mathbb{A} = \begin{pmatrix} \cos\delta \cdot e^{i\frac{\Gamma l}{2}} & -\sin\delta \cdot e^{-i\frac{\Gamma l}{2}} \\ \sin\delta \cdot e^{i\frac{\Gamma l}{2}} & \cos\delta \cdot e^{-i\frac{\Gamma l}{2}} \end{pmatrix}$$

$$\mathbb{B} = \begin{pmatrix} \cos\delta \cdot e^{i\frac{\Gamma m}{2}} & \sin\delta \cdot e^{-i\frac{\Gamma m}{2}} \\ -\sin\delta \cdot e^{i\frac{\Gamma m}{2}} & \cos\delta \cdot e^{-i\frac{\Gamma m}{2}} \end{pmatrix}$$

$$\mathbb{A} \cdot \mathbb{B} =$$

$$\begin{pmatrix} \cos^2\delta \cdot e^{i\frac{\Gamma l + \Gamma m}{2}} + \sin^2\delta \cdot e^{-i\frac{\Gamma l - \Gamma m}{2}}, & \sin\delta\cos\delta\left(e^{i\frac{\Gamma l - \Gamma m}{2}} - e^{i\frac{\Gamma l + \Gamma m}{2}}\right) \\ \sin\delta\cos\delta\left(e^{i\frac{\Gamma l + \Gamma m}{2}} - e^{i\frac{\Gamma l - \Gamma m}{2}}\right), & \cos^2\delta \cdot e^{-i\frac{\Gamma l + \Gamma m}{2}} + \sin^2\delta \cdot e^{-i\frac{\Gamma l - \Gamma m}{2}} \end{pmatrix}$$

where, $$\Gamma l + \Gamma m = (ns - nf)\frac{2\pi}{\lambda_0}(l - m)$$

$$\Gamma l - \Gamma m = (ns - nf)\frac{2\pi}{\lambda_0}(l + m)$$

if $\delta = 0$, then, $$\begin{pmatrix} Ex' \\ Ey' \end{pmatrix} = \begin{pmatrix} e^{i\frac{\Gamma l + \Gamma m}{2}} & 0 \\ 0 & e^{-i\frac{\Gamma l + \Gamma m}{2}} \end{pmatrix} \begin{pmatrix} Ex \\ Ey \end{pmatrix} \quad (4)$$

$$= \begin{pmatrix} e^{\frac{\pi}{4}i} & 0 \\ 0 & e^{-\frac{\pi}{4}i} \end{pmatrix} \begin{pmatrix} Ex \\ Ey \end{pmatrix}$$

The sum (=l+m) of the thicknesses l and m of the quartz plates 1 and 2 is in a wide range. Namely, the phase difference "$\Gamma l - \Gamma m$" fluctuates between 0 and $2\pi$, and therefore, an element in the first row and second column and an element in the second row and first column in the Jones matrices AB in the expression (4) may become zero (the first and second terms of the exponential function become equal to each other), or may become maximums. This may be the reason why, if the orthogonality of the optical axes of the elemental quartz plates 18 and 19 is low, an absolute contrast value is low, and in addition, contrast widely fluctuates.

The data shown in FIG. 7 was measured with an illuminating optical system of 4.0 in F number and 7 degrees in cone angle.

Table 2 shows a comparison between the contrast of an image displayed with an image displaying apparatus employing quartz wave plates and the contrast of an image displayed with an image displaying apparatus employing polycarbonate-film wave plates.

TABLE 2

Comparison of characteristics of quartz wave plate and polycarbonate wave plate

Red

| Sample | Poly-carbonate | Quartz | | | | |
|---|---|---|---|---|---|---|
| | | R1 | R5 | R4 | R3 | R2 |
| Orthogonality | | 15 | 22 | 34 | 38 | 40 |
| Contrast | 1165 | 1101 | 723 | 551 | 166 | 482 |

Green

| Sample | Poly-carbonate | Quartz | | | |
|---|---|---|---|---|---|
| | | G1 | G2 | G3 | G4 |
| Orthogonality | | 13 | 18 | 26 | 33 |
| Contrast | 1026 | 839 | 626 | 652 | 497 |

Blue

| Sample | Poly-carbonate | Quartz | | | | | | |
|---|---|---|---|---|---|---|---|---|
| | | B1 | B2 | B3 | B4 | B5 | B6 | B7 |
| Orthogonality | | 22 | 24 | 29 | 34 | 37 | 39 | 40 |
| Contrast | 786 | 760 | 439 | 533 | 154 | 224 | 432 | 210 |

The contrast of an image displayed with the image displaying apparatus employing the quartz wave plates will be higher than that employing the polycarbonate wave plates if the orthogonality of optical axes of the elemental quartz plates 18 and 19 of each quartz wave plate is at least within 15 minutes.

Second Embodiment of Quartz Wave Plate

A second embodiment of the quartz wave plates 6, 10, and 12 of the image displaying apparatus according to the present invention will be explained.

The second embodiment prepared quartz wave plate samples having total thicknesses of 2 mm and 0.5 mm and measured the contrast of an image displayed with the image displaying apparatus employing the samples and the orthogonality of optical axes of elemental quartz plates (18, 19) of each sample. Table 3 shows a result of the measurement.

TABLE 3

| Thickness | Orthogonality of optical axes | Red | Green | Blue |
|---|---|---|---|---|
| Total thickness 2 mm | Within 10 minutes | 1100 | 900 | 600 |
| Total thickness 0.5 mm | Within 10 minutes | 1000 | 1000 | 1000 |
| | 30 minutes | | | 450 |

Even with the total thickness of 0.5 mm, the contrast of a displayed image is unacceptably low if the orthogonality of optical axes of the elemental quartz plates (18, 19) is low (i.e., a deviation from a right angle is large).

When the orthogonality of the optical axes of the elemental quartz plates is within 10 minutes, a displayed image has sufficient contrast.

This indicates that a decrease in the contrast of a displayed image due to low orthogonality (large deviation from a right angle) of the optical axes of elemental quartz plates differs in nature from that due to a large total thickness of elemental quartz plates.

Third Embodiment of Quartz Wave Plate

A third embodiment of the quartz wave plates 6, 10, and 12 of the image displaying apparatus according to the present invention will be explained.

This embodiment employs an illuminating optical system of F2.4 for the image displaying apparatus.

Quartz wave plate samples each made of elemental quartz plates (18, 19) whose optical axes have an orthogonality of within 10 minutes were prepared, and the contrast of an image displayed with the samples was compared with that displayed with polycarbonate-film wave plates. Table 4 shows a result of the comparison.

TABLE 4

| | Thickness | Orthogonality of optical axes | Red | Green | Blue |
|---|---|---|---|---|---|
| | Polycarbonate | | 1508 | 1579 | 739 |
| Quartz | Total thickness 0.5 mm | Within 10 minutes | 1080 | 1116 | 493 |
| | Total thickness 0.4 mm | Within 10 minutes | 1020 | 1521 | 574 |

Table 4 indicates that the quartz wave plate with elemental quartz plates having optical axes orthogonality of within 10 minutes is capable of displaying an image of sufficient contrast.

A quartz wave plate made of two elemental quartz plates is produced through the processes of:

(1) cutting pure Z-plates from a quartz Z-plate ore;

(2) measuring optical axes of the pure Z-plates;

(3) forming an orientation flat (planar chamfer) on each pure Z-plate orthogonal or parallel to the optical axis of the pure Z-plate;

(4) polishing each Z-plate to a predetermined thickness; and (5) bonding two Z-plates according to the orientation flats serving as reference.

Processing an elemental quartz plate to a predetermined flatness and thickness is achievable with the use of known techniques, and therefore, it is relatively easy to form a pair of elemental quartz plates (18, 19) having a predetermined thickness difference. Measuring an optical axis on a given elemental quartz plate and forming an orientation flat thereon involves an error of several minutes. This sort of error unavoidably occurs during mechanical mass-production processes even if an X-ray inspection device is employed for precision measurement. Adhering two circular elemental quartz plates to each other according to the orientation flats thereof is carried out by using one of the orientation flats as a reference and by adjusting the other to the reference.

Experimental production of elemental quartz plates and tests conducted thereon clarified that mass-producing quartz wave plates having orthogonality of within five minutes is hardly achievable.

Accordingly, it is preferable to produce quartz wave plates having orthogonality within the range of 5 to 15 minutes.

Fourth Embodiment of Quartz Wave Plate

A fourth embodiment of the quartz wave plates 6, 10, and 12 of the image displaying apparatus according to the present invention will be explained.

Unlike the polymeric-film wave plates, the quartz wave plates can control the contrast of an optical system to some extent by adjusting the total thickness of each quartz wave plate. The fourth embodiment is based on this.

For example, in the case of the blue-beam quartz wave plates each having a thickness difference T of 12.3 μm in Table 3, a thinner one having a total thickness of 0.5 mm realizes higher contrast than a thicker one having a total thickness of 2 mm.

Utilizing such characteristics of quartz wave plates can balance contrasts of three primary colors R, G, and B and improve gradation reproducibility of displayed images.

Gradation reproducibility is more important for recent image displaying apparatuses, in particular, for those of home use. To improve gradation reproducibility, absolute contrast values of the three primary colors must be high and primary-color optical systems must maintain stable contrast. If the primary-color optical systems provide different contrast values, a black color will not correctly be reproduced due to a color temperature change when the brightness of a white color is decreased toward that of a black color.

Fifth Embodiment of Quartz Wave Plate

A fifth embodiment of the quartz wave plates 6, 10, and 12 of the image displaying apparatus according to the present invention will be explained.

The fifth embodiment laminates the quartz wave plate of any one of the preceding embodiments with a fused silica plate to prevent the bending or warping of the quartz wave plate when it is thin. Laminating a fused silica plate on each surface of a quartz wave plate makes it possible to further thin the quartz wave plate.

The plate laminated on a quartz wave plate may be made of not only fused silica but also any other glass.

Sixth Embodiment of Quartz Wave Plate

A sixth embodiment of the quartz wave plates 6, 10, and 12 of the image displaying apparatus according to the present invention will be explained.

The sixth embodiment provides an external face of the plate laminated on a quartz wave plate according to the fifth embodiment with a curvature, to correct the magnification chromatic aberration of a projection lens.

Figure 10A:
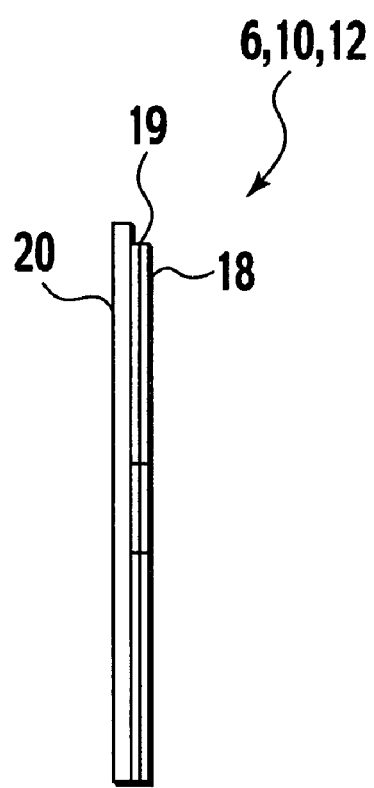
FIGS. 10A and 10B are side and front views showing a quartz plate having a thickness of l, a fast axis of the quartz plate forming an angle θ with respect to an x-axis.
Figure 10B:
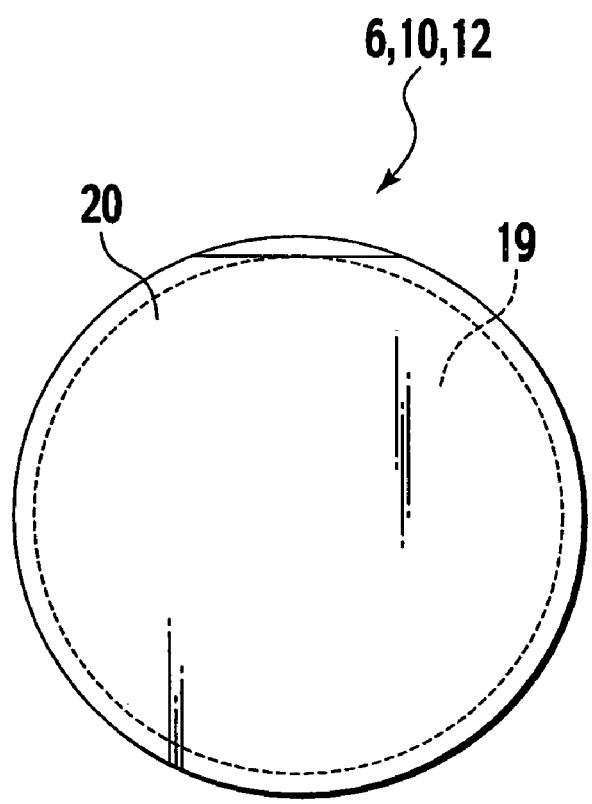

FIG. 10A is a side view showing a quartz wave plate laminated with a plate whose external face being curved and FIG. 10B is a front view showing the same.

In FIGS. 10A and 10B, the plate 20 laminated on the quartz wave plate has an external spherical face curved at a curvature radius of, for example, 4517.82 mm. If the quartz wave plate itself is curved, the center and periphery thereof cause a thickness difference to vary retardance values depending on locations. Curving the plate 20 laminated on the quartz wave plate solves this problem and can correct the magnification chromatic aberration of a projection lens. Correcting the magnification chromatic aberration of a projection lens by curving the surface of a wave plate itself is disclosed in, for example, Japanese Patent No. 3365618.

That which is claimed:

1. An image displaying apparatus comprising:
a white light source configured to emit a white beam;
a separating-combining unit having wavelength selective wave plates and polarizing beam splitters, configured to receive the white beam and separate the white beam into three primary-color beams and receive reflected beams, combine the reflected beams, and emit the combined beams;

reflective spatial light modulators configured to receive the three primary-color beams, respectively, modulate the received beams, and reflect the modulated beams toward the separating-combining unit;

a projecting unit configured to receive the combined beams and project the combined beams; and a quartz wave plate arranged between each of the polarizing beam splitters of the separating-combining unit and each of the reflective spatial light modulators, configured to adjust a polarization direction of the beam emitted from the separating-combining unit toward the reflective spatial light modulator, the quartz wave plate having laminated two elemental quartz plates, an angle formed between slow axes of the two elemental quartz plates being within a range of 5 minutes to 15 minutes from a right angle.

2. The image displaying apparatus of claim 1, wherein
the quartz wave plate is arranged in each of optical paths of the three primary-color beams emitted from the separating-combining unit; and
a total thickness of the quartz wave plate is individually determined according to a wavelength of the primary-color beam to transmit.

3. The image displaying apparatus of claim 1, wherein the quartz wave plate is provided with, on one or both surfaces thereof, a glass plate having no birefringence.

4. The image displaying apparatus of claim 3, wherein an external surface of the glass plate is provided with a curvature.

5. The image displaying apparatus of claim 1, wherein the quartz wave plate is provided with, on one or both surfaces thereof, a glass plate having an external spherical face curved at a curvature radius.

* * * * *